United States Patent
Zimmerman

[15] 3,657,532
[45] Apr. 18, 1972

[54] COMPENSATED NUCLEAR DENSOMETER AND METHOD

[72] Inventor: Carl W. Zimmerman, Duncan, Okla.
[73] Assignee: Halliburton Company, Duncan, Okla.
[22] Filed: Apr. 11, 1969
[21] Appl. No.: 815,333

[52] U.S. Cl. .................250/43.5 D, 250/71.5 R, 250/83.3 D
[51] Int. Cl. .......................................................G01n 23/12
[58] Field of Search..............250/43.5 D, 83.3 D, 83 C, 71.5

[56] References Cited

UNITED STATES PATENTS

| | | | |
|---|---|---|---|
| 2,675,483 | 4/1954 | Leighton et al. | 250/83.6 |
| 2,898,466 | 8/1959 | Lintz et al. | 250/43.5 |
| 3,060,313 | 10/1962 | Ohmart et al. | 250/43.5 |
| 3,521,065 | 7/1970 | Locke | 250/83.3 |

Primary Examiner—James W. Lawrence
Assistant Examiner—Davis L. Willis
Attorney—Burns, Doane, Swecker & Mathis

[57] ABSTRACT

Method and apparatus for compensating a digital nuclear densometer for decay in the intensity of the radiation source, drift and instability of the detectors, temperature and other factors. A common source of radiation is used to irradiate separate detectors through substances of known and unknown density and a ratio between the number of pulses in the output signals of the detectors taken to compensate for conditions common to both detectors. The detectors are energized by a common source to minimize drift and instability and a circuit is provided for digitally linearizing the relationship between the number of pulses in the output signal and the density of the substance under investigation.

12 Claims, 7 Drawing Figures

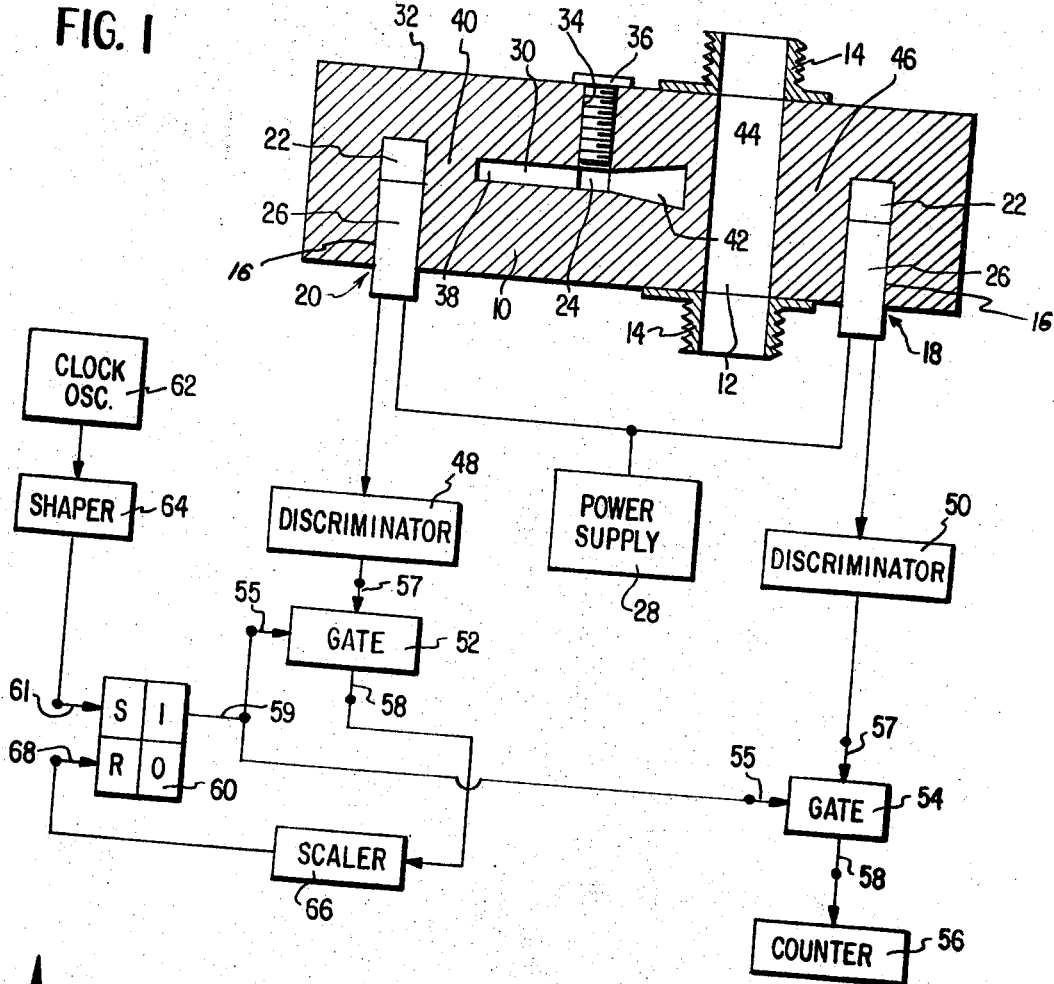
FIG. 1
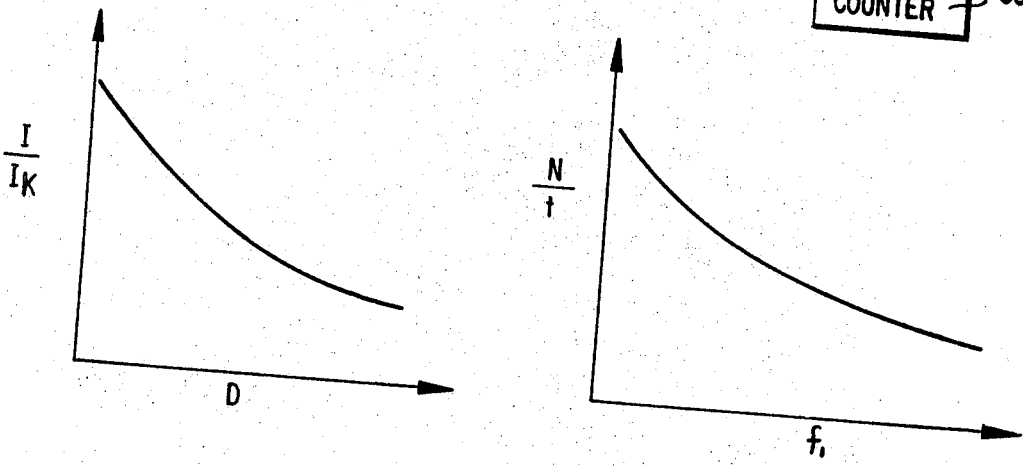
FIG. 3
FIG. 5
INVENTOR
CARL W. ZIMMERMAN

INVENTOR
CARL W. ZIMMERMAN

BY Burns, Doane, Benedict, Swecker & Mathis
ATTORNEYS.

INVENTOR
CARL W. ZIMMERMAN

BY Burns, Doane, Benedict, Swecker & Mathis
ATTORNEYS.

COMPENSATED NUCLEAR DENSOMETER AND METHOD

BACKGROUND OF THE INVENTION

The present invention relates to nuclear densometers and more particularly to a method and apparatus for digitally linearizing the output of a nuclear densometer and for compensating the output signal therefrom for factors such as decay in the intensity of the source and density variations due to temperature or the like.

The prior art has attempted to solve the problem of compensation for source decay by the utilization of a differential analog amplifier responsive to the analog output signals of detectors irradiated from a common source through samples of known and unknown density. Systems of this type are illustrated in the Thourson et al., U.S. Pat. No. 2,937,275. These analog systems are, however, subject to instability and to drift, factors to which digital systems are not generally responsive. Moreover, the use of digital systems allows the incorporation of extremely reliable, inexpensive, and compact integrated circuits.

Other prior art attempts to compensate the integral of a variable such as density with respect to a second independent variable such as temperature or pressure have utilized complex mechanical devices such as Bourdon tubes and mechanical cams. Prior art systems of this type are illustrated in the Dallmann et al., U.S. Pat. No. 2,243,475.

It is accordingly, an object of the present invention to obviate the deficiencies of the prior art and to provide a novel method and apparatus for compensating the output signal of a nuclear densometer by means of digital pulse counting techniques.

It is another object of the present invention to provide a novel method and apparatus for compensating a nuclear densometer for decay in the intensity of the source.

It is still another object of the present invention to provide a novel method and apparatus for compensating a digital nuclear densometer for changes in density due to temperature variations in the substance whose density is being investigated.

It is a further object of the present invention to provide a novel method and apparatus for linearizing the output of a digital nuclear densometer.

THE DRAWINGS

A preferred embodiment of the invention as illustrated in the following figures in which:

FIG. 1 is a schematic block diagram illustrating one embodiment of the present invention;

FIG. 3 is a graph of the ratio of radiation intensity with and without a substance to be investigated plotted against the density of that substance;

FIG. 5 is a graph of the pulses in the output signal of the circuit of FIG. 4 per unit time against the frequency of the signal of the compensating detector;

DETAILED DESCRIPTION

Figure 2:
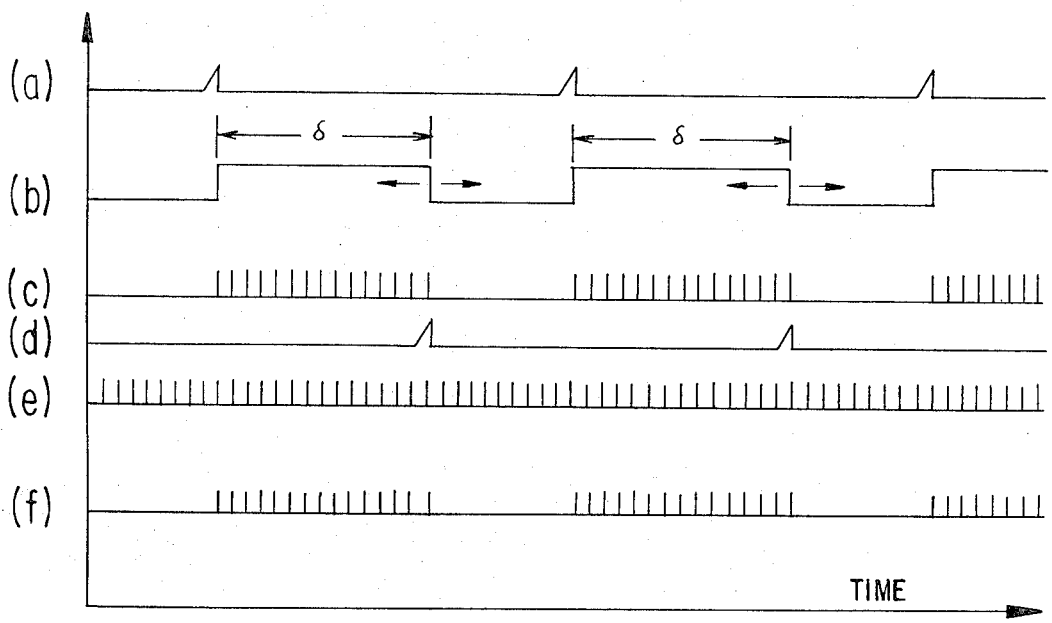
FIG. 2 is a family of graphs illustrating the wave forms at the indicated places in the circuit of FIG. 1.

Referring now to FIG. 1, the housing 10 is provided with a bore 12 through which the substance of unknown density is caused to flow. Externally threaded coupling members 14 may be mounted on the housing 10 coaxially with the bore 12 in a conventional manner such as by welding. A flow path defining conduit (not shown) for the substance to be investigated may be removably coupled to the members 14.

A pair of radiation detectors 18 and 20 are located in substantially identical bore 16 spaced from bore 12. The two detectors 18 and 20 may be conventional and may desirably be identical in structure and operation. Each of the detectors 18 and 20 may comprise, for example, a crystal 22 or other material capable of scintillating under irradiation by a source 24 of gamma rays and may include an electron photomultiplier tube 26 located in light-receiving proximity to the crystal 22. The photomultiplier tubes 26 are also conventional and well known in the art and may be any device capable of converting the light flashes or scintillation of the crystal 22 into electrical pulses. The crystal 22 may be of a conventional scintillating material such as a thallium doped sodium iodide crystal.

Both of the photomultipliers 26 are energized by a single power supply 28 to eliminate any possible differences in the pulse output therefrom due to variations in the high voltage supplied therefrom to the respective photomultipliers 26.

The housing 10 may be provided with an elongated central cavity 30 which opens to the upper surface 32 of the housing 10 through a bore 34. The bore 34 may be internally threaded to receive a threaded bolt or plug 36 which may be removed for access to the source 24 of gamma radiation disposed in the central portion of the elongated cavity 30. The plug 36 and the housing 10 are desirably constructed of a material having gamma radiation absorbing properties and should be of sufficient thickness to eliminate potential hazards to personnel in the vicinity of the densometer.

The scintillating crystal 22 of the detector 20 receives only that radiation from the source 24 which has traversed the left-hand portion 38 of the cavity 30 and the portion 40 of the housing 10 disposed between the source 24 and the scintillating crystal 22. As the distance between the cavity 30 and the crystal 22 and the density of the material of which the housing 10 is constructed is known, the output of the photomultiplier tube 20 may be determined for a gamma radiation source 24 having a given intensity. Assuming a constant rate of gamma ray emission from the source 24, a percentage of the gamma rays emitted will be absorbed in the material 40 and will not reach the crystal 22 of the detector 20. Those rays reaching the crystal 22 will generate a scintillation or flash of light which will be detected in the output signal of the photomultiplier tube 20 as an electrical pulse. These pulses are not periodic but are random in occurrence.

The counting rate of the output signal from the photomultiplier tube 20 is thus a function of the density of the portion 40 of the housing 10 through which the gamma rays must pass to reach the crystal 22 and of the intensity of the source 24.

The counting rate of the output signal from the photomultiplier tube 18 is similarly related to the density of the material through which the rays must pass to reach the crystal 22 of the detector 18 and of the intensity of the source 24. As the gamma radiation from the source 24 must not only traverse the right-hand portion 42 of the central cavity 30 and the portions 44 and 46 of the housing 10 disposed between the source 24 and the scintillating crystal 22, but must also traverse the substance of unknown density in the bore 12 as well, the counting rate of the output signal of the detector 18 is related to and will vary with changes in the intensity of the source 24 and the unknown density of the substance in the bore 12.

A pair of discriminators 48 and 50 are provided to receive the respective output signals from the photomultiplier tubes 26 so that only those scintillation responsive pulses of a predetermined amplitude will be passed through the discriminators 48 and 50 to the respective gates 52 and 54. The gates 52 and 54 may be conventional both in circuitry and operation and must receive an enabling signal on their respective control terminal 55 in order to pass the signal applied to the input terminal 57 to the output terminal 58.

The gate 54 is connected between the discriminator 50 and the counter 56 which displays the output signal of the densometer. Both of the gates 52 and 54 may be enabled by a high signal on the binary "1" output terminal 59 of a conventional bistable circuit or flip-flop 60. The set input terminal 61 of the flip-flop 60 is connected to receive an input signal from a suitable conventional clock oscillator 62. The pulses from the clock oscillator 62 may be shaped in a shaper 64 to insure a steep wave front. The pulses from the discriminator 48 are passed through the enabled gate 52 and may be fed through a scaler 66 which effectively divides the number of pulses applied thereto by a predetermined fixed number, i.e., one output pulse is generated only after the accumulation of the predetermined number of input pulses at which time the scaler 66 is reset. The scaler 66 may be connected to the reset terminal 68 of the flip-flop 60.

Operation of the circuit may more easily be explained with reference to the family of graphs illustrated in FIG. 2. Graph (a) represents the shaped output of the fixed frequency clock oscillator 62 as applied to the set input terminal 61 of the flip-flop 60. The output of the flip-flop 60 is indicated in graph (b) and is a positive pulse initiated upon the application of each pulse of the waveform illustrated in graph (a) which is applied to the terminal 61. Each pulse of the waveform illustrated in graph (b) terminates a variable time $\delta$ later upon the application of a pulse to the reset input terminal 68 of the flip-flop 60 as will be explained. The pulse width $\delta$ must, of course, be less than the period between successive pulses of the clock oscillator 62.

Graph (c) illustrates the series of pulses in the signal from the discriminator 48 which are applied to the scaler 66. The pulses on graph (d) illustrate the output signal of the scaler 66 and each occurs upon the application of a predetermined fixed number of pulses to the scaler, 15 pulses in the illustrated example. The pulses of the waveform (d) which are applied to the reset input terminal 68 of the flip-flop 60 terminates the enabling pulses illustrated in graph (b) and thereby disables both of the gates 52 and 54.

Graph (e) illustrates the randomly occurring pulses in the output signal from the discriminator 50 which are applied to the input of gate 54. As indicated in graph (f), only these pulses in the series of pulses of the signal illustrated in graph (e) which are applied to the input terminal 57 of the gate 54 during the period $\delta$ of the enabling pulses of the waveform of graph (b) are passed to the densometer counter 56.

In summary, the occurrence of a clock pulse sets the flip-flop 60 and enables the gate 54 to pass pulses from the discriminator 50 to the densometer counter 56 until a predetermined fixed number of pulses from the reference detector 20 are received by the scaler 66 to reset the flip-flop 60. The total number of pulses passed to the counter 56 is thus less than the number of scintillations detected by detector 18 and passed through discriminator 50. How many fewer of these pulses is a function of the width $\delta$ of the enabling pulses from the flip-flop 60. The width $\delta$ of the enabling pulse is in turn dependent upon the intensity of the source 24 as detected by the detector 20. Compensation for the decay in source 24 intensity may thus be made in the manner hereinafter described.

The number of pulses n passed through the gates 54 during each gating period may be shown to be:
$$n = \delta r_1 \quad (1)$$
where $\delta$ is the gate width and $r_1$ is the counting rate of the output of the detector 18.

The gate width $\delta$ may, however, be calculated by the formula
$$\delta = S_1/r_2 \quad (2)$$
where $S_1$ is the scaling factor of scaler 66 and $r_2$ is the counting rate of the output of detector 20.

Substituting for $\delta$ in equation (1),
$$n = S_1 \frac{r_1}{r_2}. \quad (3)$$

Due to half life decay, the activity of the source becomes
$$I = I_0 e^{-\alpha t} \quad (4)$$

where $I$ is the intensity at time $t$, $I_0$ is the initial intensity and $\alpha$ is the decay factor.

For a material having a given density, $$n = S_1 \frac{k_2 I_{o-18} e^{-\alpha t}}{k_1 I_{o-20} e^{-\alpha t}} \quad (5)$$

where $I_{o-18}$ and $I_{o-20}$ are initial intensities at detectors 18 and 20, respectively.

Letting $k_3 = S_1 \frac{k_2}{k_1}$, \quad (6)

$$n = k_3 \frac{I_{o-18}}{I_{o-20}} \quad (7)$$

The number of pulses n in a gating period is thus independent of source decay.

The total number of pulses N appearing at the densometer output counter 56 in time $t$ is $$N = f_3 t S_1 \frac{r_1}{r_2} \quad (8)$$

where $f_3$ is the output frequency, a constant, of clock oscillator 62.

The counting rate indicated by counter 56 corrected for source decay is thus $$\frac{N}{t} = f_3 S_1 \frac{r_1}{r_2} \quad (9)$$

The radiation intensity $I$ is, of course, directly related to the counting rate $N/t$.

The intensity I may also be stated to be $$I = I_k e^{-kD(u/D)} \quad (10)$$

where $u/D$ is the mass absorption coefficient of the substance in the bore 12 $I_k$ is the radiation intensity at the detector 18 with bore 12 empty $k$ is a constant dependent upon the width of the bore 12 and D=the density of the material.

Rewriting equation (10)

$$\frac{I}{I_k} = e^{-kD(u/D)}. \quad (11)$$

Figure 4:
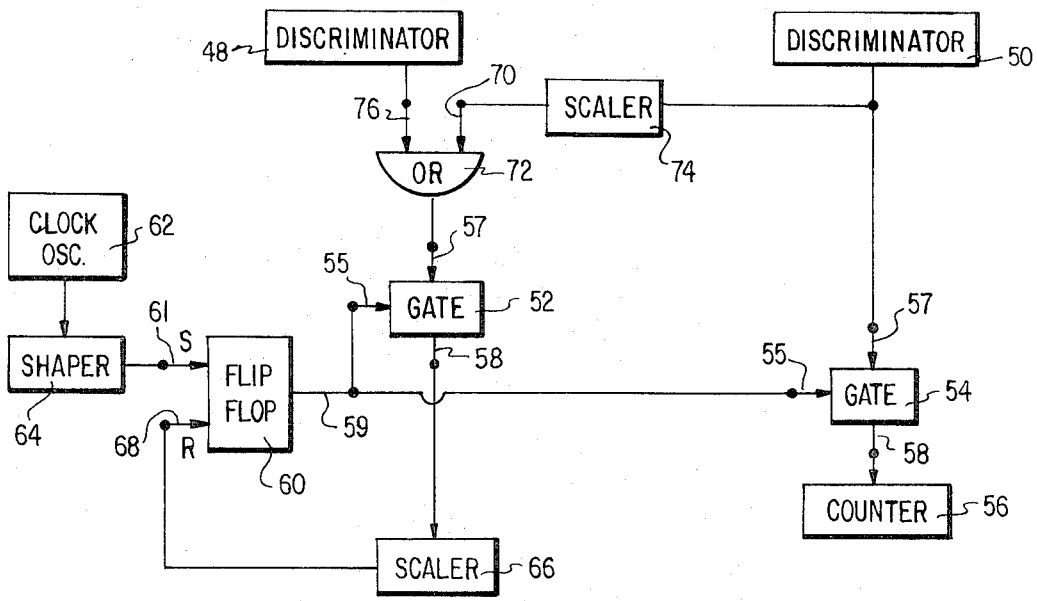
FIG. 4 is a modification of the circuit of FIG. 1.

A plot of equation (11) is illustrated in FIG. 3. Given the ratio of intensity $I$ over intensity at zero density $I_k$, the density $D$ of the substance may easily be calculated or simply read from the plot of FIG. 3.

Where it is desired to maintain a digital readout and to compensate for nonlinearity in the relationship between the number of pulses accumulated in the counter 56 and the density $D$, the circuitry of FIG. 1 may be modified as indicated in FIG. 4.

Referring to FIG. 4, the unknown density responsive output signal of discriminator 50 may be applied to the input terminal 57 of the gate 54 as earlier described. The output signal from the discriminator 50 may also be applied to the input terminal 70 of two input OR gates 72 by way of a scaler 74. The known density responsive output of the discriminator 48 may be applied to the other input terminal 76 of the OR gate 72. The output terminal of the OR gate 72 may, in turn, be directly connected to the input terminal 57 of the gate 52.

In this manner, the input terminal 57 of the gate 52 receives not only the discriminated output signal from the detector 20 FIG. 1, but also receives an occasional additional compensating pulse from the scaler 74. The scaling factor $S_2$ of the scaler 74 may be adjusted to achieve the proper compensation necessary to linearize the relationship between the ratio of the output signals of the detectors 18 and 20 with respect to the density of the unknown substance in the bore 12.

Where the time of observation $t$ is equal to an integral number of cycles of the output signal $f_3$ of the clock oscillator 62, the counting rate $N/t$ corrected for source decay (Equation 9) becomes $$\frac{N}{t} = f_3 S_1 \frac{r_1}{r_2 + \frac{r_1}{S_2}} \quad (12)$$

which may be rewritten as $$\frac{N}{t} = f_3 S_1 \frac{S_2 r_1}{S_2 r_2 + r_1} \qquad (13)$$

Figure 6:
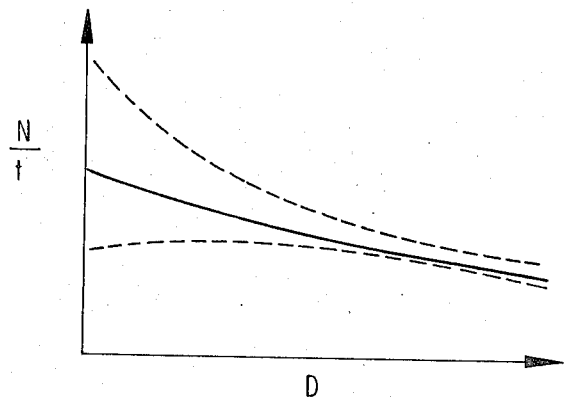
FIG. 6 is a graph illustrating the linearization of the output signal of the densometer.

A plot of Equation (12) is illustrated in FIG. 5. Applying the function of the curve illustrated in FIG. 5 to the function illustrated in the curve of FIG. 3, linearization is achieved as indicated in FIG. 6.

Figure 7:
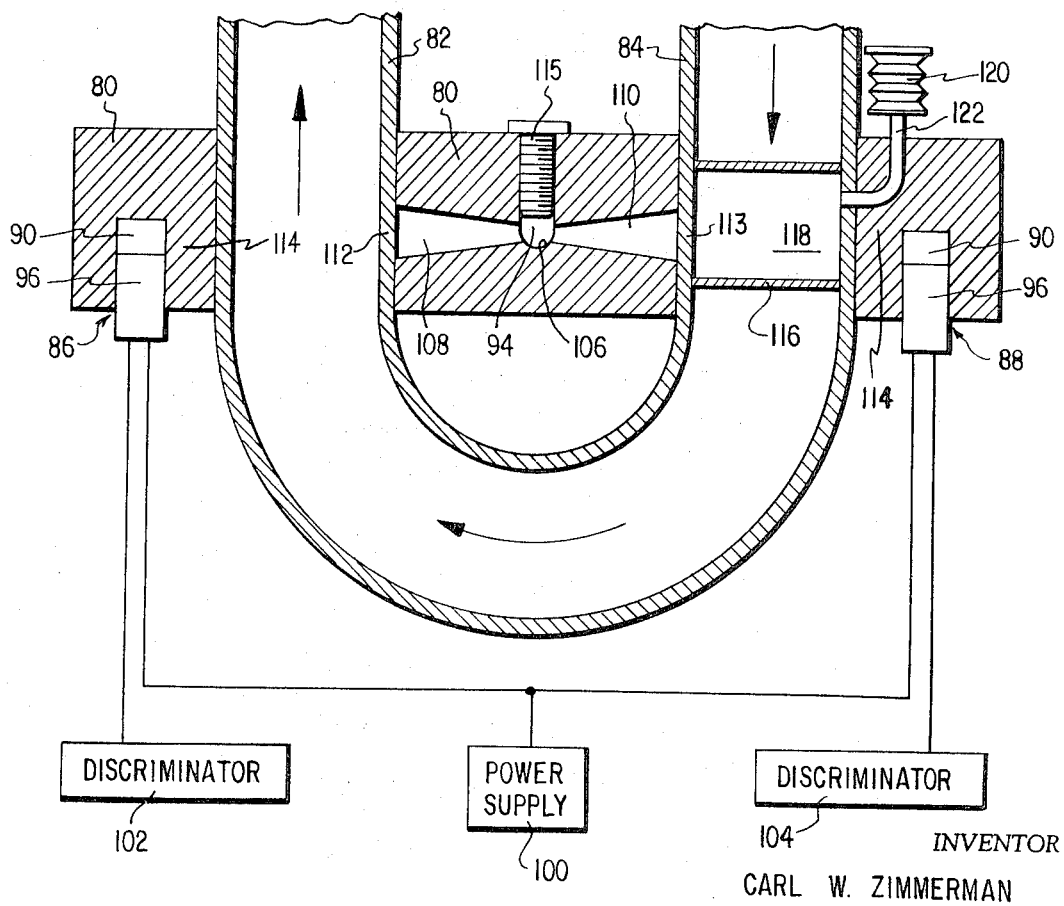
FIG. 7 is a schematic diagram of an embodiment of the present invention specifically adapted for temperature compensation.

The novel concept of the present invention may also include the compensation of a densometer for changes in density related to changes in the temperature of the substance whose density is being measured. With reference to FIG. 7, a housing 80 of gamma ray absorbing material may be apertured to receive the two arms 82 and 84 of a U-shaped conduit through which the substance of unknown density may be caused to flow. A pair of radiation detectors 86 and 88 may be located respectively in the plane of the conduit on the outside of the arms 82 and 84. The two detectors 86 and 88 may be conventional and may be of the type earlier described in connection with the embodiment of FIG. 1. Each of the detectors 86 and 88 may thus include a crystal 90 capable of scintillating under irradiation by gamma rays and a photomultiplier tube 96 located in light receiving proximity thereto. The photomultiplier tubes 96 may receive their power from a common high voltage power supply 100 and may provide output signals respectively to discriminators 102 and 104 in the manner earlier described in connection with FIG. 1.

A source of gamma rays 94 may conveniently be disposed in the center of an elongated cavity 106 in the housing 80 intermediate the arms 82 and 84 of the conduit. The cavity 106 may lie in the plane of the conduit and may include a left-hand portion 108 and a right-hand portion 110 which extend respectively from the source 94 to the internal walls 112 and 113 of the arms 82 and 84 of the conduit. The gamma ray absorbing material of the portions 114 of the housing located respectively between walls 112 and 113 of the conduit and the scintillating crystals 90 may conveniently be of the same thickness. The housing 80 may be provided with a threaded aperture and bolt 115 to facilitate access to the central cavity 106 in the manner illustrated in the embodiment of FIG. 1.

A second conduit 116 may be disposed between the wall 113 of the arm 84 of the conduit and the crystal 90 of the detector 88. This conduit 116 may be disposed in the plane of the U-shaped conduit and of a diameter such that the flow of the material through the arm 84 is not seriously impeded. The conduit 116 is desirably constructed of a material having excellent heat transfer characteristics so that the substance 118 disposed in the conduit 116 may remain at the same temperature as the substance flowing through the U-shaped conduit. The substance 118 is desirably the same as the substance in the U-shaped conduit, so as to present identical temperature, density and gamma ray absorption characteristics, but is, of course, isolated therefrom.

A bellows 120 may be connected in fluid communication with the conduit 116 by means of a tube 122. The bellows 120 will allow expansion and contraction of the substance 118 in the conduit 116 with changes in temperature and thus maintain the conduit 116 at maximum capacity.

In operation, the gamma radiation from the source 94 is directed through the left-hand portion 108 of the elongated cavity 106 through the walls 112 of the arm 82 of the U-shaped conduit, through the substance of unknown density, and through the portion 114 of the housing where the radiation is detected by the detector 86. A change in the density of the substance flowing through the U-shaped conduit will thus be reflected in the output signal from the detector 86. This change will reflect changes in density due to temperature changes as well as changes in the substance itself.

In a similar manner, the gamma rays emitted from the source 94 pass through the right-hand portion 110 of the cavity 106, through the walls 113 of the housing, through the substance 118 along the axis of the conduit 116, and through the portion 114 of the housing 80 where the radiation is detected by the detector 88. Since the substance 118 is isolated from the substance flowing in the arm 84 of the U-shaped conduit, changes in the density of the substance in the U-shaped conduit will not be reflected in the output signal from the detector 88. The detector 88 will be solely responsive to the changes in density which occur with changes in temperature.

The output signals from the discriminators 102 and 104 may be connected to the circuit illustrated in FIG. 1 to effect temperature compensation of the output signal from the detector 86. It is clear from the foregoing discussion that a change in the temperature of the unknown density substance will be reflected in the output signals from both detectors 86 and 88 and that the ratio of the two may remain substantially unaffected. However, a change in the density of the substance from a reason other than temperature will affect only the output signal from the discriminator 102 and will affect the ratio.

While this system is particularly adapted to the measurement of API gravity of crude oil where extremely good resolution of density measurement is required along with good accuracy and high stability, other adaptations and advantages of the invention will be readily apparent to one skilled in the art to which the invention pertains from a reading of the foregoing. It is accordingly intended that the foregoing description be illustrative only and that the scope of the invention be limited only by the language, with a full range of equivalents, of the appended claims.

I claim:

1. A nuclear densometer comprising:
 a source of nuclear radiation;
 a first radiation detector positioned with respect to said source to detect radiation passing through a first substance having an unknown density, said detector producing an output signal comprising a first series of electrical pulses having a counting rate related to the density of the first substance;
 a second radiation detector positioned with respect to said source to detect radiation passing through a second substance having a known density, said detector producing an output signal comprising a second series of electrical pulses having a counting rate related to the density of the second substance;
 means for generating a third series of electrical pulses having a predetermined frequency substantially less than the counting rate of said first and second series of electrical pulses;
 means for counting pulses; and
 circuit means applying the pulses in the first series of electrical pulses to said counting means during periods initiated by a pulse in the third series of electrical pulses and terminated by a pulse in the second series of electrical pulses.

2. The densometer of claim 1 wherein said circuit means comprises:
 a first gate connected between said first detector and said counting means;
 a terminal on said gate for receiving an enabling signal; and
 means for generating said enabling signal comprising
 scaler means for generating an output pulse in response to a predetermined number of input pulses;
 a second gate for passing pulses in the second series of electrical pulses to said scaler means when enabled and for otherwise blocking the passage of pulses in the second series of electrical pulses; and
 bistable circuit means having set and reset conditions for enabling said gates when in a set condition, said bistable circuit being placed in a set condition in response to each of the pulses in the third series of electrical pulses and being placed in a reset condition in response to an output pulse from said scaler means
 whereby pulses in the first series of electrical pulses are passed to said counter means during periods initiated by a pulse in the third series of electrical pulses and terminated by a pulse in the second series of electrical pulses.

3. The densometer of claim 1 wherein said circuit means comprises:
   a first gate connected between said first detector and said counting means for passing pulses in the first series of electrical pulses to said counting means when enabled and for otherwise blocking the passage of pulses in the first series of electrical pulses;
   means responsive to the pulses in the first series of electrical pulses for generating a fourth series of electrical pulses;
   means for summing the pulses in the second and fourth series of electrical pulses;
   and means for enabling said first gate in response to a pulse in said third series of electrical pulses and for disabling said gate in response to a predetermined number of pulses in said summed second and fourth series of electrical pulses.

4. The densometer of claim 3 wherein said first gate enabling means comprises:
   a bistable circuit having set and reset conditions, said bistable circuit being placed in a set condition by each pulse in said third series of electrical pulses;
   a scaling means for generating an output pulse in response to a predetermined number of input pulses;
   a gate for passing pulses in said second and fourth series of electrical pulses to said scaler when enabled and for otherwise blocking the passage of pulses, said bistable circuit being placed in a reset condition in response to each output pulse generated by said scaler means.

5. A system for compensating the output signal of a digital nuclear densometer for measuring density variations related to first and second variable physical conditions for variations in density related to the second variable physical condition comprising:
   first generator means for generating a first series of electrical pulses having a counting rate related to density variations due to first and second variable physical conditions;
   second generator means for generating a second series of electrical pulses having a counting rate related to density variations due to the second variable physical condition;
   third generator means for generating a series of uniformly spaced electrical pulses at a frequency substantially less than the counting rate of the first and second series of electrical pulses; and
   circuit means for counting the pulses in the first series of electrical pulses during periods initiated by a pulse in the third series of electrical pulses and terminated by a pulse in the second series of electrical pulses.

6. The densometer of claim 5 wherein said circuit means comprises:
   counter means for counting electrical pulses;
   a first gate for passing pulses in the first series of electrical pulses to said counter means when enabled and for otherwise blocking the passage of pulses in the first series of electrical pulses;
   scaler means connected to said second generator means for generating an output pulse in response to a predetermined number of pulses in said second series of electrical pulses;
   bistable circuit means having set and reset conditions for enabling said first gate when in a set condition, said bistable circuit being placed in a set condition in response to a pulse in the third series of electrical pulses and being placed in a reset condition by each output pulse from said scaler means;
   whereby the pulses in the first series of electrical pulses are passed to said counter means during periods initiated by a pulse in the third series of electrical pulses and terminated by a pulse in the second series of electrical pulses.

7. A nuclear densometer comprising:
   a radiation resistant housing having first and second spaced bores and a fluid passage through said housing between said bores, said housing having an elongated cavity between said fluid passage and said first bore, said cavity, said passage and at least a portion of said bores being substantially coplanar;
   a source of nuclear radiation disposed in said cavity;
   a first radiation detector positioned in said first bore to receive radiation passing through said housing from said source;
   a second radiation detector positioned in said second bore to receive radiation passing through said housing and the fluid in said fluid passage;
   said detectors respectively providing first and second series of electrical pulses having counting rates related to the intensity of the radiation received; and
   digital circuit means for determining the ratio of the number of the pulses in said first and second series of electrical pulses.

8. The densometer of claim 7 wherein said detectors include a crystal capable of scintillating upon irradiation, a photomultiplier disposed in light receiving relationship to said crystal, and means for discriminating with respect to the amplitude of the output signals of said photomultiplier.

9. The densometer of claim 7 including a body of fluid disposed between said source and said first detector, the fluid in said body having radiation absorption and temperature characteristics similar to the fluid in said passage and disposed in heat transmitting relation thereto whereby the radiation received by said first detector passes through said housing and said fluid body.

10. The densometer of claim 7 wherein said fluid passage is defined by a U-shaped conduit the arms of which pass on opposite sides of said source, and wherein said fluid body is disposed in one arm of said U-shaped conduit out of fluid communication with the fluid therein.

11. A method of compensating a nuclear densometer for decay in the strength of the nuclear source comprising the steps of:
   a. generating a first series of electrical pulses having a counting rate related to the density of a substance having an unknown density;
   b. generating a second series of electrical pulses having a counting rate related to the density of a substance having a known density;
   c. generating a third series of electrical pulses at a uniform fixed frequency substantially less than the counting rate of the first and second series of electrical pulses; and
   d. counting the pulses in the first series of electrical pulses during periods initiated by a pulse in the third series of electrical pulses and terminated by a pulse in the second series of electrical pulses.

12. The method of compensating a digital nuclear densometer for density variations related to one of two variable physical conditions to which the densometer is responsive comprising the steps of:
   a. generating a first series of electrical pulses having a counting rate related to variations in density due to a first variable condition;
   b. generating a second series of electrical pulses having a counting rate related to variations in density due to a second variable condition;
   c. generating a third series of electrical pulses having a predetermined fixed frequency; and
   d. counting the pulses of the third series of electrical pulses during a time interval commencing with a pulse of the first series of electrical pulses and terminating with a pulse of the second series of electrical pulses.

* * * * *